United States Patent
Ro

(10) Patent No.: US 9,630,477 B2
(45) Date of Patent: Apr. 25, 2017

(54) DEVICE FOR PREVENTING HEAD LAMP GLARE AND METHOD FOR PREVENTING GLARE USING THE SAME

(71) Applicant: Hyundai Motor Company, Seoul (KR)

(72) Inventor: HeeJin Ro, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/937,723

(22) Filed: Nov. 10, 2015

(65) Prior Publication Data

US 2016/0339768 A1 Nov. 24, 2016

(30) Foreign Application Priority Data

May 20, 2015 (KR) .................. 10-2015-0070643

(51) Int. Cl.
*G06K 9/40* (2006.01)
*B60J 3/04* (2006.01)
(Continued)

(52) U.S. Cl.
CPC ............ *B60J 3/04* (2013.01); *G02B 27/0101* (2013.01); *G06K 9/00825* (2013.01); *G06T 5/20* (2013.01);
(Continued)

(58) Field of Classification Search
CPC B60Q 2300/42; B60Q 1/143; B60Q 2300/41; B60Q 1/2696; B60Q 1/302; B60Q 1/2665; B60Q 1/1207; B69Q 1/0023; G02B 2027/0118; G02B 2027/0138; G02B 27/01; G02B 5/20; G02B 27/014; G02B 27/0101; G02B 2027/014; G06K 9/00604; G06K 9/00845; G06K 9/2027; G06K 9/00832; G06K 9/00825; H04N 5/2353; B60S 1/0844; G06T 5/20; B60J 3/04
(Continued)

(56) References Cited

U.S. PATENT DOCUMENTS

| 7,199,767 B2* | 4/2007 | Spero ............... G02B 5/20 |
| | | 250/203.4 |
| 8,648,535 B2* | 2/2014 | Tatara ............... B60Q 1/18 |
| | | 315/81 |

(Continued)

FOREIGN PATENT DOCUMENTS

| JP | 2001018738 A | 1/2001 |
| KR | 10-0535406 B1 | 12/2005 |
| KR | 20140079907 A | 6/2014 |

OTHER PUBLICATIONS

Yang, Jiang "A Vehicle Detection for Night Vision", Dept. of Info. and Telecomm. Engineering Graduate School, Univ. of Incheon, English Abstract, 50 pages (2012).

*Primary Examiner* — Kanjibhai Patel
(74) *Attorney, Agent, or Firm* — Mintz Levin Cohn Ferris Glovsky and Popeo, P.C.; Peter F. Corless

(57) ABSTRACT

A method for preventing glare caused by a head lamp of an opposite side vehicle is provided. The method includes detecting a position of the head lamp from an image photographed in a front direction of a vehicle, when a light is detected in front of the vehicle. The detected position of the head lamp is then matched on a head-up display image and a filtering image is generated to block the light of the head lamp using the head-up display image. The filtering image is finally output on a vehicle windshield.

18 Claims, 8 Drawing Sheets

(51) Int. Cl.
　　　*G02B 27/01*　　　(2006.01)
　　　*G06K 9/00*　　　(2006.01)
　　　*G06T 5/20*　　　(2006.01)

(52) U.S. Cl.
　　　CPC .................. *G02B 2027/014* (2013.01); *G02B 2027/0138* (2013.01)

(58) Field of Classification Search
　　　USPC .................................................. 382/260, 275
　　　See application file for complete search history.

(56) References Cited

U.S. PATENT DOCUMENTS

| | | | |
|---|---|---|---|
| 8,659,406 B2* | 2/2014 | Usami | B60Q 1/143 340/425.5 |
| 8,952,616 B2* | 2/2015 | Sekiguchi | F21S 48/17 315/77 |
| 9,061,632 B2* | 6/2015 | Toyofuku | B60R 1/00 |
| 9,328,886 B2* | 5/2016 | Guan | F21S 48/10 |
| 2003/0169213 A1 | 9/2003 | Spero | |

* cited by examiner (i)                    (ii)

DEVICE FOR PREVENTING HEAD LAMP GLARE AND METHOD FOR PREVENTING GLARE USING THE SAME

CROSS-REFERENCE TO RELATED APPLICATION

This application claims priority to and the benefit of Korean Patent Application No. 10-2015-0070643 filed in the Korean Intellectual Property Office on May 20, 2015, the entire contents of which are incorporated herein by reference.

BACKGROUND (a) Field of the Invention

The present invention relates to a device for preventing the head lamp glare and a method for preventing glare using the same.

(b) Description of the Related Art

Recently, a head-up display (HUD) is being mounted within vehicles to improve a front observation ratio and to display vehicle driving information. However, the HUD is used to display simple vehicle driving information in front of the vehicle, and is operated only for a display function. Additionally, a head lamp of an opposite side vehicle applies a negative influence to secure a view of a driver in traveling at night (e.g., during poor lighting conditions). Particularly, an accident risk increases in the road due to a glare caused by a light of the head lamp.

Further, an adaptive head lamp is a technology of protecting the glaring of the driver. However, the adaptive head lamp reduces the light into an opposite lane when the opposite side vehicle is detected (e.g., an approaching vehicle is detected), and protects the glaring of an opposite side vehicle's driver. Since the adaptive head lamp is only applied for protecting the opposite side vehicle's driver, there is a need a technology to protect the glaring of the driver of a present vehicle (e.g., traveling, subject vehicle, etc.).

The above information disclosed in this section is merely for enhancement of understanding of the background of the invention and therefore it may contain information that does not form the prior art that is already known in this country to a person of ordinary skill in the art.

SUMMARY

The present invention provides a device and a method for preventing glare from the head lamp caused by a light of a head lamp of an opposite side vehicle using a head-up display as a filter.

An exemplary embodiment of the present invention provides a method for preventing glare by a head lamp of an opposite side vehicle, that may include: detecting a position of the head lamp from an image photographed in front of a vehicle (e.g., in a front direction), when a light is detected in front of the vehicle; matching the detected position of the head lamp on a head-up display image; generating a filtering image to block (e.g., obstruct) the light of the head lamp using the head-up display image; and outputting the filtering image on a windshield of the vehicle (e.g., a subject or traveling vehicle).

The detection of the position of the head lamp may include capturing the image in front of the vehicle using an imaging device (e.g., a camera, video camera, or the like) of a black box or an imaging device of a Lane Departure Warning System; and recognizing the head lamp from the photographed image. The recognition of the head lamp may include recognizing the light as the head lamp when at least two lights having a similar distance to the width of a vehicle is detected. The matching on the HUD image may include transforming the position of the head lamp to a coordinate of the head-up display image using distance information between of the head lamp of the opposite side vehicle (e.g., an approaching vehicle or a vehicle traveling towards the subject vehicle). The generation of the filtering image may include generating the filtering image to include a blocking region to block the light of the head lamp. The method may include terminating the output of the filtering image when the opposite side vehicle passes the traveling vehicle (e.g., is no longer traveling towards the vehicle).

An exemplary embodiment of the present invention provides a device for preventing glare by a head lamp and may include: a head lamp position detection unit configured to detect a position of a head lamp illuminating a light, from an image photographed in front of a vehicle; a coordinate transforming unit configured to transform the detected position of the head lamp to match on a head-up display image; and an output unit configured to generate a filtering image to block the light of the head lamp and output the filtering image on a windshield of the vehicle.

The device may further include a controller configured to determine the generation and output of the filter image, and terminate the output of the filtering image when the opposite side vehicle has passed the vehicle. The coordinate transforming unit may include a matching unit configured to match the position of the head lamp of opposite side vehicle on the head-up display image using distance information between of the head lamps of the opposite side vehicle.

The controller may further be configured to adjust the head-up display image to output at an area that the light of the head lamp is illuminated on the windshield. The output unit may include a filtering image generating unit configured to generate a filtering image that overlaps with the head-up display image and form a blocking region to block the light of the head lamp. The filtering image generating unit may further be configured to generate a black image to block the light of the head lamp at the blocking region.

According to the present invention for achieving the object, by generating a filtering image to block the light of the head lamp of the opposite side vehicle and outputting the filtering image on the windshield with the head-up display image, the glare of the driver may be prevented even during poor or low lighting conditions and front visibility may be improved.

BRIEF DESCRIPTION OF THE DRAWINGS

The above and other features of the present invention will now be described in detail with reference to exemplary embodiments thereof illustrated by the accompanying drawings which are given herein below by way of illustration only, and thus are not limitative of the present invention, and wherein.

DESCRIPTION OF SYMBOLS

Figure 1:
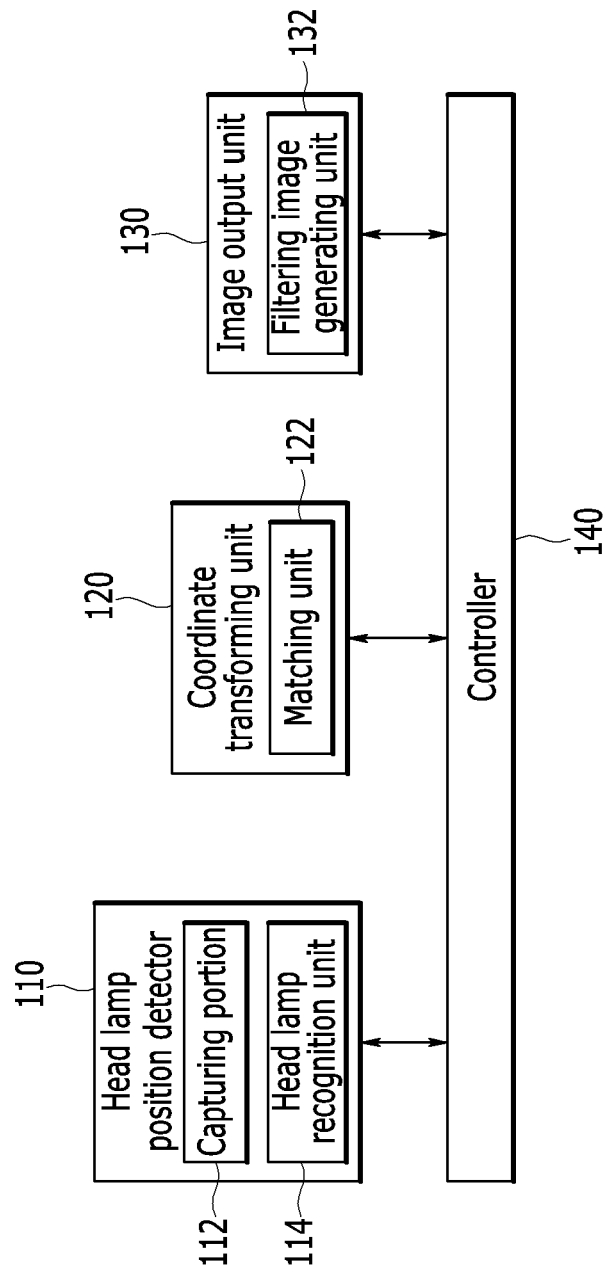
FIG. 1 is a diagram of a device for preventing glare by a head lamp according to an exemplary embodiment of the present invention.

10: driver
20: windshield
30: opposite side vehicle
40: HUD image
50: filtering image
110: head lamp position detector
120: coordinate transforming unit
130: image output unit
140: controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

A device for preventing glare caused by the head lamp and a method for preventing glared caused by the head lamp will now be described with reference to FIG. 1 to FIG. 8. FIG. 1 is a diagram of a device for preventing glare by a head lamp according to an exemplary embodiment of the present invention. In particular, for convenience of explanation, a configuration of the device for preventing glare by the head lamp according to the exemplary embodiment of the present invention is schematically illustrated, but the device for preventing glare by the head lamp is not limited thereto.

Referring to FIG. 1, the device for preventing glare by the head lamp 100 according to an exemplary embodiment of the present invention may include a head lamp position detector 110, a coordinate transforming unit 120, an image output unit 130 and a controller 140. The controller 140 may be configured to operate the various other units of the device. In particular, the head lamp position detector 110 may be configured to analyze an image photographed in front of a vehicle (e.g., image capturing the front environment of a vehicle), recognize the head lamp of an opposite side vehicle (e.g., an approaching vehicle) that reflects a light, and detect a position of the head lamp. The head lamp position detector 110 may include a capturing portion 112 and a head lamp recognition unit 114 according to an exemplary embodiment of the present invention.

The capturing portion 112 (e.g., an imaging device) may be configured to obtain (e.g., capture, photograph, etc.) the image in front of the vehicle, and provide the image to the head lamp recognition unit 114. The capturing portion 112 may include a camera of a black box or a camera of a Lane Departure Warning System (LDWS). The head lamp recognition unit 114 may be configured to detect the lighting head lamp using a technology of recognizing a camera image and to recognize the head lamp by a gray scale image. Additionally, the head lamp recognition unit 114 may be configured to recognize the light as the head lamp when at least two lights having a distance similar to the width of the vehicle is detected.

The coordinate transforming unit 120 may be configured to transform the detected position of the head lamp in the head lamp position detector 110 into three-dimensional (3D) coordinates for matching in the HUD image. The coordinate transforming unit 120 may further be configured to transform coordinates using a size and a position reflected in vehicle design. Additionally, the coordinate transforming unit 120 may be configured to transform the position of the head lamp of the opposite side vehicle as coordinates of the HUD image using a distance information between of the head lamp of the opposite side vehicle (e.g., a vehicle traveling in the opposite direction from the subject vehicle). The coordinate transforming unit 120 may include a matching unit 122 according to an exemplary embodiment of the present invention.

The matching unit 122 may be configured to match the photographed image with the HUD image and detect the position of the head lamp in the HUD image. The image output unit 130 may be configured to generate a filtering image to block the light of the head lamp, and output the filtering image on the windshield. The image output unit 130 may include a filtering image generating unit 132 according to an exemplary embodiment of the present invention. The filtering image generating unit 132 may be configured to form or generate a blocking region to the coordinates matched in the HUD image, and generate a black image to block the light of the head lamp at the blocking region. Additionally, when the position of the head lamp does not exist in the HUD image, the filtering image generating unit 132 may be configured to generate the filtering image to an entire region of the HUD image.

The controller 140 may be configured to determine whether to generate and output the filtering image, and may be configured to turn off the filtering image after the opposite side vehicle is crossed by (e.g., after the opposite side vehicle has traveled past the subject vehicle and is no longer outputting light at the subject vehicle). For such an object, the controller 140 may be implemented with at least one processor operating by a predetermined program, and the predetermined program may be programmed to perform each step according to a method for preventing glaring by the head lamp according to an exemplary embodiment of the present invention.

Figure 2:
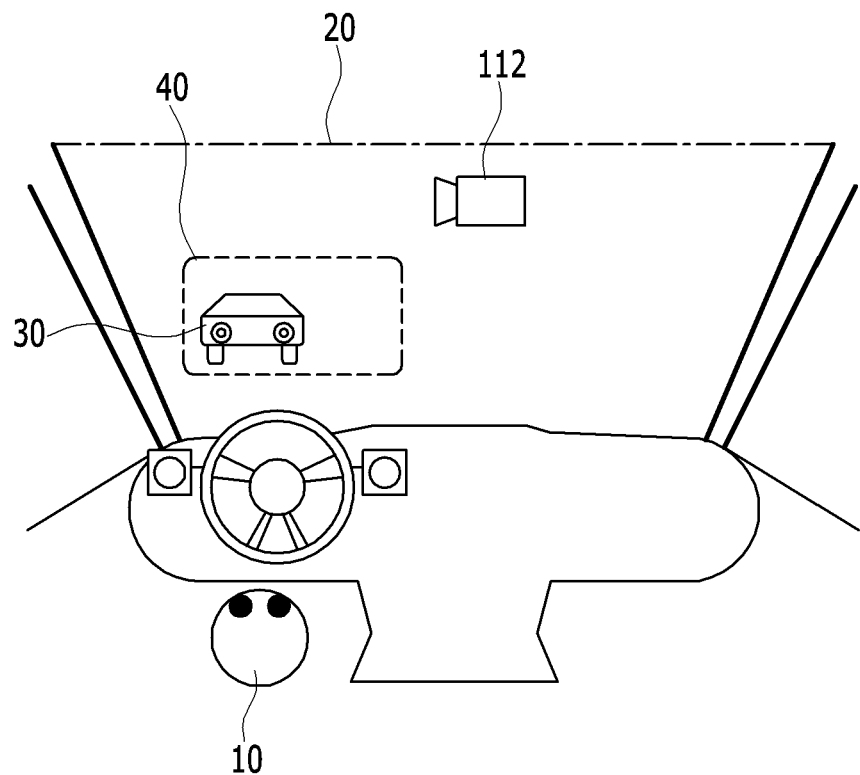
FIG. 2 is a diagram showing a heads-up display (HUD) image output on a windshield of a vehicle according to an exemplary embodiment of the present invention.

FIG. 2 is a diagram showing a heads-up display (HUD) image output on the windshield of the vehicle. Referring to FIG. 2, in the device for preventing glare by the head lamp 100 according to an exemplary embodiment of the present invention, the capturing portion 112 may be configured to photograph in front of the vehicle (e.g., an environment in the driving direction of the vehicle), and output the HUD image 40 on the windshield 20 of the vehicle.

Particularly, the device for preventing glare by the head lamp 100 according to an exemplary embodiment of the present invention may be configured to analyze the photographed image, detect the position of the head lamp of the opposite side vehicle 30, and generate the filtering image to block the light of the head lamp. In addition, the device for preventing glare by the head lamp 100 according to an exemplary embodiment of the present invention may be configured to output the filtering image to the HUD image 40, thereby protecting the glare of driver 10 by the head lamp of the opposite side vehicle 30.

Figure 3:
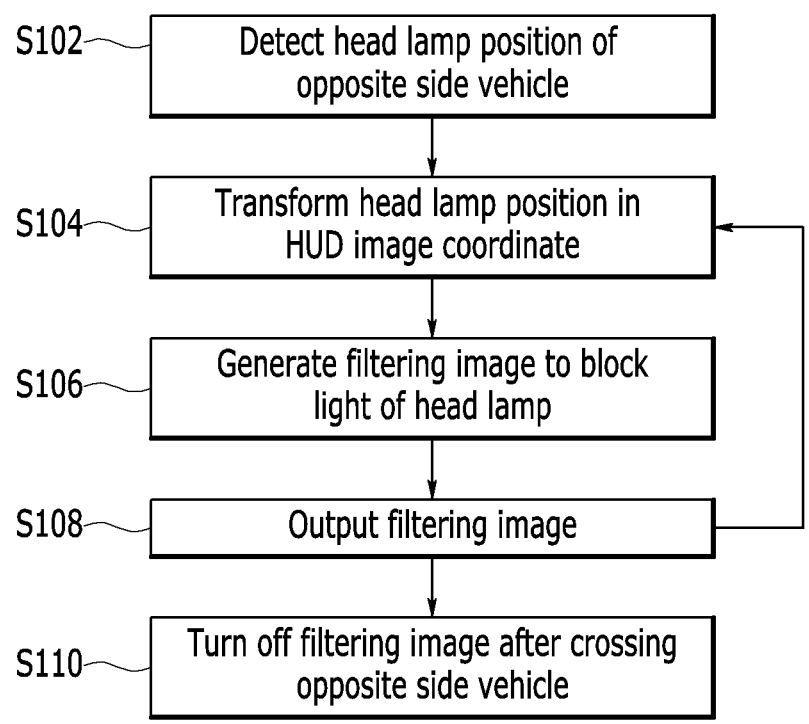
FIG. 3 is a flowchart showing a process of preventing glare due to a head lamp of an opposite side vehicle by a device for preventing glare by the head lamp according to an exemplary embodiment of the present invention.

FIG. 3 is a flowchart briefly showing a process of preventing glare due to the head lamp of an opposite side vehicle by a device for preventing glare by the head lamp according to an exemplary embodiment of the present invention. The following flowchart will be described with the same reference numerals as that of a configuration of FIG. 1.

Referring to FIG. 3, the device, operated by the controller, for preventing glare by the head lamp 100 according to an exemplary embodiment of the present invention may be configured to detect the positions of the head lamp of the opposite side vehicle from the photographed image (S102). The device for preventing glare by the head lamp 100 may be configured to recognize the head lamp when at least two lights having a distance similar to the width of a vehicle is detected. Additionally, the device for preventing glare by the head lamp 100 may be configured to transform the position of the head lamp to the coordinates in the HUD image (S104). Particularly, the device may be configured to match the image photographed in front of vehicle with the HUD image output on a windshield, and detect the position of the head lamp in the HUD image.

Figure 4:
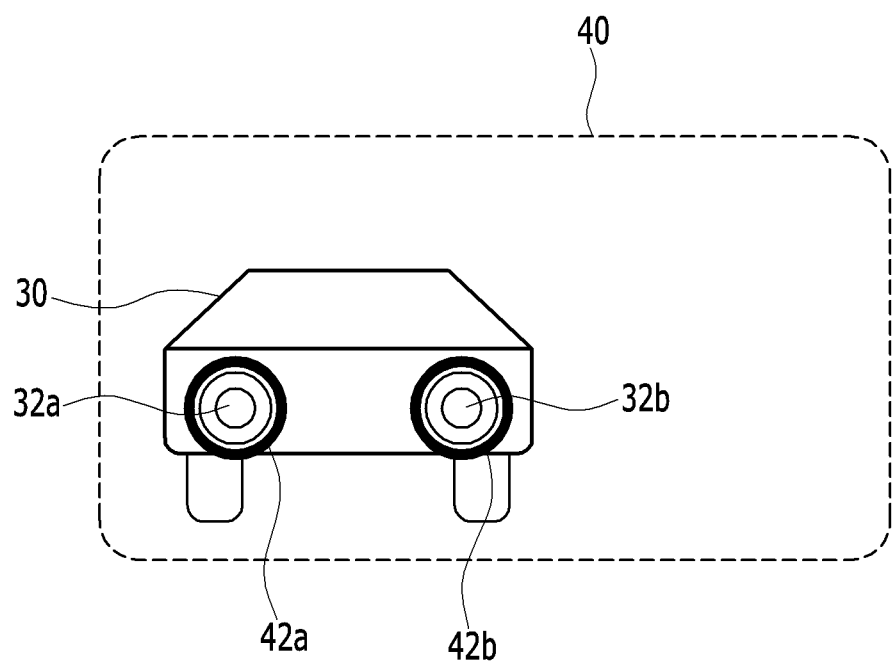
FIG. 4 is a diagram showing a position of the head lamp matched as a coordinate in the HUD image according to an exemplary embodiment of the present invention.

FIG. 4 is a diagram showing a position of the head lamp matched as a coordinate in the HUD image. Referring to FIG. 4, the head lamps 32a and 32b of the opposite side vehicle 30 may be displayed in the HUD image 40. In addition, the device may be configured to sense the positions 42a and 42b of the head lamp of the opposite side vehicle in the HUD image 40 using coordinate information obtained by analyzing the photographed image. Further, the device may be configured to generate the filtering image to block the light of the head lamp (S106). The filtering image may include a blocking region to block the light of the head lamp in the HUD image. The filter image may further display a black image to block the light of the head lamp at the blocking region, or display a bright image at a remaining region except for the blocking region.

Figure 5:
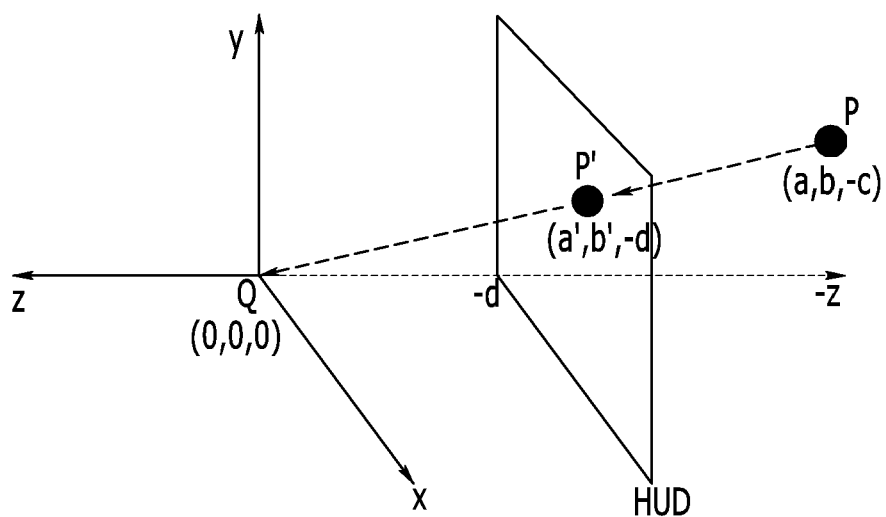
FIG. 5 is a diagram showing a position of the head lamp converted as the coordinate of the HUD image.
Figure 6:
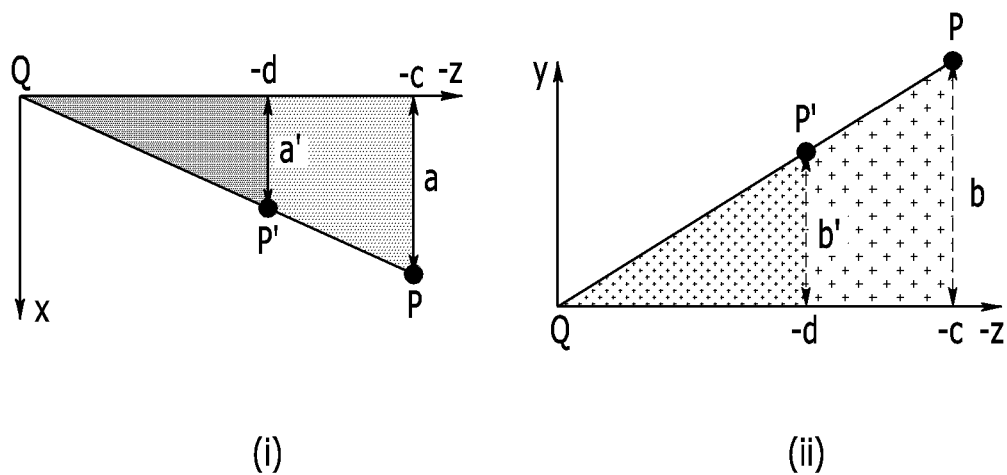
FIG. 6 is a diagram showing the coordinate displayed on i) x-z plane and ii) y-z plane according to FIG. 5.

FIG. 5 is a diagram showing a position of the head lamp converted as the coordinate of the HUD image, and FIG. 6 is a diagram showing the coordinate displayed on i) x-z plane and ii) y-z plane according to FIG. 5. The device for preventing glare by the head lamp 100 may be configured to convert a position of the head lamp photographed by an imaging device (e.g., a camera) to the coordinate of the HUD image by using a Perspective Projection View.

Referring FIG. 5 and FIG. 6, the device for preventing glare by the head lamp 100 may be configured to calculate a coordinate information P' of the HUD image from a coordinate information P of the head lamp photographed by the imaging device using the following Equation 1.

$$a': (-d) = a: (-c)$$
$$b': (-d) = b: (-c)$$
$$P' = \begin{pmatrix} a' \\ b' \\ -d \\ 1 \end{pmatrix} == \begin{pmatrix} \frac{a}{c/d} \\ \frac{b}{c/d} \\ -d \\ 1 \end{pmatrix}$$

Equation 1 wherein Q is a position of a driver's eye, and is a center of a coordinate plain; P is a coordinate information of the head lamp obtained by analyzing a photographed image, and the coordinate information of P is (a, b, −c); P' is a coordinate information of the head lamp projected to the HUD image, and the coordinate information of P' is (a, b, −d).

Figure 7:
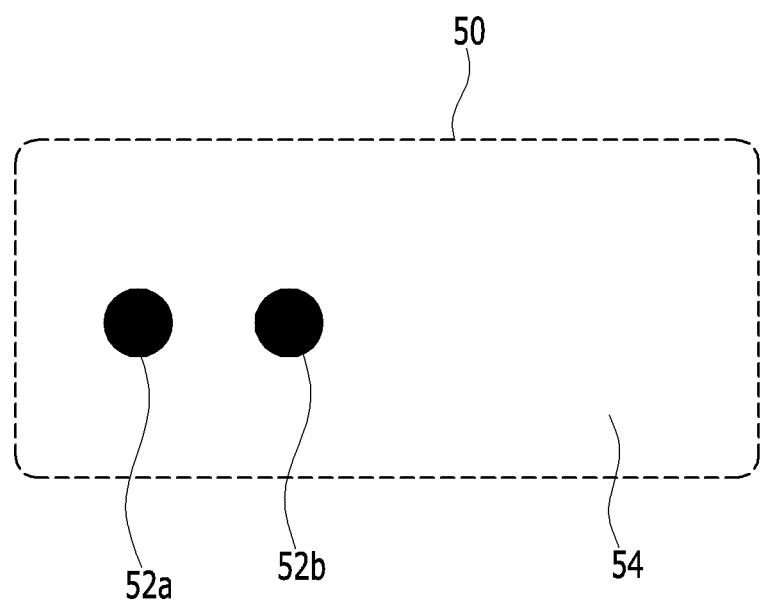
FIG. 7 is a diagram showing a filtering image including a blocking region to block the light of the head lamp according to an exemplary embodiment of the present invention.

FIG. 7 is a diagram showing a filtering image including a blocking region to block the light of the head lamp according to an exemplary embodiment of the present invention. Referring to FIG. 7, the device may be configured to generate filter image 50 to block the light of the head lamp. The filter image 50 may include the blocking regions 52a and 52b to block the light of the head lamp. Additionally, the filter image 50 may include the remaining region 54 displayed an image which is brighter than the blocking regions 52a and 52b. The device may then be configured to output the filtering image on the windshield by the HUD (S108).

Figure 8:
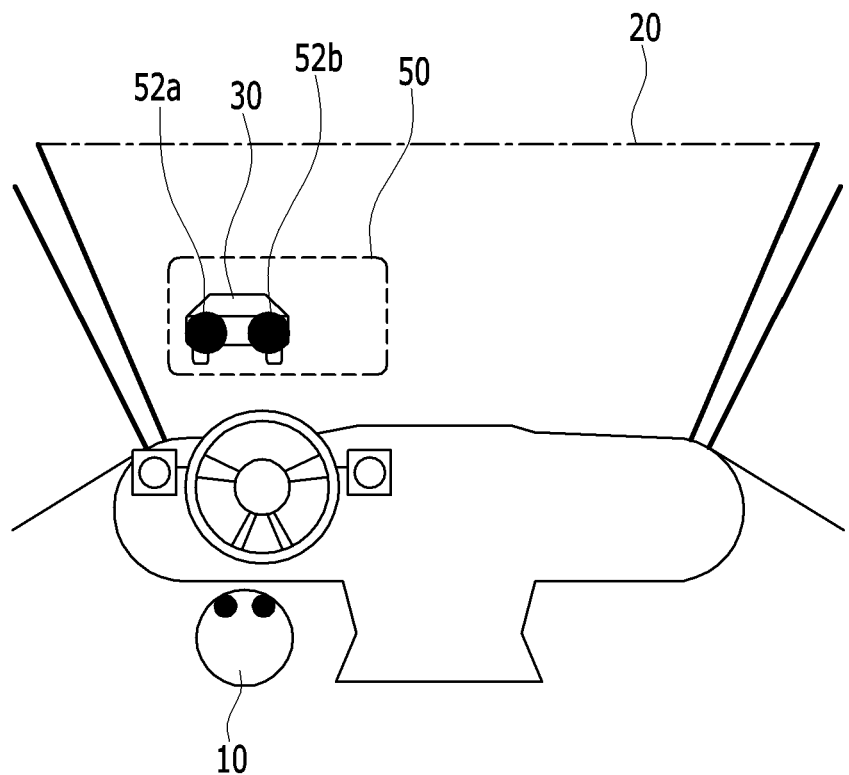
FIG. 8 is a diagram showing the filtering image output on the windshield to block the light of the head lamp according to an exemplary embodiment of the present invention.

FIG. 8 is a diagram showing the filtering image output on the windshield to block the light of the head lamp according to an exemplary embodiment of the present invention. As shown in FIG. 8, the device may be configured to output the filtering image 50 on the windshield 20 by the HUD. The light by the head lamp of the opposite side vehicle 30 may be blocked by the blocking regions 52a and 52b of the filtering image 50, and accordingly the glare of the driver 10 may be prevented.

Furthermore, the device may be configured to turn off the filtering image after the opposite side vehicle is crossed by (S110). That is, after the opposite side vehicle has driven past the subject vehicle, thus indicating that the risk of head lamp glare to the driver is decreased. The device may then be configured to update the coordinate and the filtering image in real-time based on the crossing of opposite side vehicle, and turn off the output of the filtering image after the opposite side vehicle has passed. As described, the device may be configured to generate the filtering image to block the light of the head lamp of the opposite side vehicle, and output the filtering image on the windshield with the HUD image, and thereby it may be possible to provide the environment to prevent glaring of the driver even during night driving (e.g., driving during low or poor lighting conditions) and improve front visibility.

The exemplary embodiment of the present invention described above is implemented by not only an apparatus and a method but also a program realizing a function corresponding to a configuration of the exemplary embodiment of the present invention or a recording medium recording the program.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for preventing glare by a head lamp of an opposite side vehicle, comprising:
    detecting, by a controller, a position of the head lamp from an image photographed in a front direction of a vehicle, when a light is detected in front of the vehicle;
    matching, by the controller, the detected position of the head lamp on the photographed image with a head-up display image;
    generating, by the controller, a filtering image to block the light of the head lamp using the head-up display (HUD) image; and
    outputting, by the controller, the filtering image on a windshield.

2. The method for preventing glaring by a head lamp of claim 1, wherein the detecting of the position of the head lamp includes:
    photographing, by the controller, the image in front of the vehicle using a camera of a black box or a camera of a Lane Departure Warning System; and
    recognizing, by the controller, the head lamp from the photographed image.

3. The method for preventing glaring by a head lamp of claim 2, wherein the recognizing of the head lamp includes:
    recognizing, by the controller, the light as the head lamp when at least two lights having a distance similar to the width of a vehicle are detected.

4. The method for preventing glaring by a head lamp of claim 1, wherein the matching of on the HUD image includes:
    transforming, by the controller, the position of the head lamp to a coordinate of the head-up display image using distance information between of the head lamp of the opposite side vehicle.

5. The method for preventing glaring by a head lamp of claim 1, wherein the generating of the filtering image includes:
    generating, by the controller, the filtering image to include a blocking region to block the light of the head lamp.

6. The method for preventing glaring by a head lamp of claim 1, further comprising:
    terminating, by the controller, the output of the filtering image when the opposite side vehicle has passed.

7. A device for preventing glaring by a head lamp, comprising:
    a head lamp position detection unit configured to detect a position of the head lamp illuminating a light, from an image photographed in a front direction of a vehicle;
    a coordinate transforming unit configured to transform the detected position of the head lamp to match the detected position on the photographed image with a head-up display image; and
    an output unit configured to generate a filtering image to block the light of the head lamp and output the filtering image on a windshield.

8. The device for preventing glaring by a head lamp of claim 7, further comprising:
    a controller configured to generate and output of the filter image, and terminate the output of the filtering image when the opposite side vehicle has passed.

9. The device for preventing glaring by a head lamp of claim 8, wherein the coordinate transforming unit includes:
    a matching unit configured to match the position of the head lamp of opposite side vehicle on the photographed image with the head-up display image using distance information between the head lamps of the opposite side vehicle.

10. The device for preventing glaring by a head lamp of claim 9, wherein the controller is configured to adjust the head-up display image to output at an area that the light of the head lamp is illuminated on the windshield.

11. The device for preventing glaring by a head lamp of claim 10, wherein the output unit includes:
    a filtering image generating unit configured to generate a filtering image overlapping with the head-up display image and forming a blocking region to block the light of the head lamp.

12. The device for preventing glaring by a head lamp of claim 11, wherein the filtering image generating unit is configured to generate a black image to block the light of the head lamp at the blocking region.

13. A non-transitory computer readable medium containing program instructions executed by a controller to prevent glare by a head lamp of an opposite side vehicle, the computer readable medium comprising:
    program instructions that detect a position of the head lamp from an image photographed in a front direction of a vehicle, when a light is detected in front of the vehicle;
    program instructions that match the detected position of the head lamp on the photographed image with a head-up display image;
    program instructions that generate a filtering image to block the light of the head lamp using the head-up display (HUD) image; and
    program instructions that output the filtering image on a windshield.

14. The non-transitory computer readable medium of claim 13, further comprising:
   program instructions that photograph the image in front of the vehicle using a camera of a black box or a camera of a Lane Departure Warning System; and
   program instructions that recognize the head lamp from the photographed image.

15. The non-transitory computer readable medium of claim 14, further comprising:
   program instructions that recognize the light as the head lamp when at least two lights having a distance similar to the width of a vehicle is detected.

16. The non-transitory computer readable medium of claim 13, further comprising:
   program instructions that transform the position of the head lamp to a coordinate of the head-up display image using distance information between of the head lamp of the opposite side vehicle.

17. The non-transitory computer readable medium of claim 13, further comprising:
   program instructions that generate the filtering image to include a blocking region to block the light of the head lamp.

18. The non-transitory computer readable medium of claim 13, further comprising:
   program instructions that terminate the output of the filtering image when the opposite side vehicle has passed.

* * * * *